(12) United States Patent
Koseoglu

(10) Patent No.: US 12,098,331 B2
(45) Date of Patent: Sep. 24, 2024

(54) ENHANCED HYDROPROCESSING PROCESS WITH AMMONIA AND CARBON DIOXIDE RECOVERY

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 856 days.

(21) Appl. No.: 16/670,971

(22) Filed: Oct. 31, 2019

(65) Prior Publication Data

US 2021/0130705 A1    May 6, 2021

(51) Int. Cl.
*C10G 45/02*    (2006.01)
*B01D 53/14*    (2006.01)
(Continued)

(52) U.S. Cl.
CPC .......... *C10G 45/02* (2013.01); *B01D 53/1493* (2013.01); *B01J 12/00* (2013.01);
(Continued)

(58) Field of Classification Search
CPC ............ C10G 45/02; C10G 2300/1055; C10G 2300/202; C10G 2300/4056;
(Continued)

(56) References Cited

U.S. PATENT DOCUMENTS 3,173,853 A    3/1965 Peralta
3,340,182 A    9/1967 Berkman et al.
(Continued)

FOREIGN PATENT DOCUMENTS

CN    1034905 A    8/1989
CN    103865567 A    6/2014
(Continued)

OTHER PUBLICATIONS

PCT Search Report mailed on Feb. 2, 2021, in the prosecution of Patent application PCT/US2020/057248, 14 pages.
(Continued)

*Primary Examiner* — Prem C Singh
*Assistant Examiner* — Brandi M Doyle
(74) *Attorney, Agent, or Firm* — Bracewell LLP; Constance G. Rhebergen; Eleanor T. Porter

(57) ABSTRACT

A process for capturing carbon dioxide includes the steps of mixing a hydrogen stream and a feedstock stream to produce a mixed stream, wherein the feedstock stream includes hydrocarbons, reacting the hydrocarbons and the hydrogen in the primary reactor of the hydroprocessing unit to produce a hydroprocessing product stream and a carbon dioxide stream, wherein the hydroprocessing product stream includes light products, wherein the hydroprocessing unit is further configured to produce ammonium bisulfide, collecting the ammonium bisulfide in the water to produce a sour water, processing the sour water in the waste water unit to produce an ammonia stream, a hydrogen sulfide stream, and a stripped water stream, introducing the ammonia stream to a carbon dioxide recovery system, and separating carbon dioxide from the carbon dioxide stream using the ammonia in the ammonia stream to produce a carbon dioxide product.

7 Claims, 3 Drawing Sheets

(51) Int. Cl.
*B01J 12/00* (2006.01)
*B01J 19/24* (2006.01)
*C01B 3/36* (2006.01)
*C01B 32/50* (2017.01)
*C01C 1/02* (2006.01)
*C09K 8/594* (2006.01)

(52) U.S. Cl.
CPC ............... *B01J 19/245* (2013.01); *C01B 3/36* (2013.01); *C01B 32/50* (2017.08); *C01C 1/026* (2013.01); *C09K 8/594* (2013.01); *B01D 2252/103* (2013.01); *C01B 2203/0255* (2013.01); *C01B 2203/1241* (2013.01); *C10G 2300/1055* (2013.01); *C10G 2300/202* (2013.01); *C10G 2300/301* (2013.01); *C10G 2300/4056* (2013.01); *C10G 2300/4068* (2013.01); *C10G 2400/04* (2013.01)

(58) Field of Classification Search
CPC ...... C10G 2300/301; C10G 2300/4068; C10G 2400/04; B01D 53/1493; B01D 2252/103; C01C 1/026; B01J 12/00; B01J 19/245; C09K 8/594; C01B 3/36; C01B 32/50; C01B 2203/0255; C01B 2203/1241
See application file for complete search history.

(56) References Cited

U.S. PATENT DOCUMENTS

| | | | |
|---|---|---|---|
| 6,096,195 | A | 8/2000 | Streicher et al. |
| 7,144,555 | B1 | 12/2006 | Squires et al. |
| 7,220,350 | B2 | 5/2007 | Cody et al. |
| 7,354,560 | B2 | 4/2008 | Nielsen et al. |
| 7,429,318 | B2 | 9/2008 | Cody et al. |
| 7,513,988 | B2 | 4/2009 | Oballa et al. |
| 8,221,706 | B2 | 7/2012 | Petri et al. |
| 8,518,241 | B2 | 8/2013 | Petri et al. |
| 8,536,390 | B2 | 9/2013 | Abhari |
| 8,715,980 | B2 | 5/2014 | Clarke |
| 8,809,015 | B2 | 8/2014 | Schultz et al. |
| 8,846,352 | B2 | 9/2014 | Chua et al. |
| 8,900,443 | B2 | 12/2014 | Sechrist et al. |
| 8,900,546 | B2 | 12/2014 | Van De Graaf et al. |
| 8,911,514 | B2 | 12/2014 | Banerjee et al. |
| 8,986,640 | B1 | 3/2015 | Dube |
| 9,157,058 | B2 | 10/2015 | Dalla-Betta et al. |
| 9,216,380 | B1 | 12/2015 | Augustsson et al. |
| 9,279,087 | B2 | 3/2016 | Kokayeff et al. |
| 9,452,389 | B2 | 9/2016 | Dube et al. |
| 9,499,845 | B2 | 11/2016 | Chua et al. |
| 9,512,450 | B1 | 12/2016 | Huo et al. |
| 9,562,201 | B2 | 2/2017 | Noureldin |
| 9,631,284 | B2 | 4/2017 | Braun et al. |
| 9,879,290 | B2 | 1/2018 | Kurek et al. |
| 9,957,534 | B2 | 5/2018 | Kurek et al. |
| 10,022,693 | B2 | 7/2018 | Fan et al. |
| 10,081,772 | B2 | 9/2018 | Fan et al. |
| 10,106,825 | B1 | 10/2018 | Huo et al. |
| 10,112,829 | B2 | 10/2018 | Ravikumar et al. |
| 2010/0006803 | A1* | 1/2010 | Bravo ................ C10L 3/102 252/372 |
| 2014/0356267 | A1 | 12/2014 | Hunwick |
| 2016/0045841 | A1 | 2/2016 | Kaplan et al. |
| 2017/0059260 | A1* | 3/2017 | Noureldin ............ C10G 35/04 |
| 2017/0203963 | A1* | 7/2017 | Ravikumar ......... C01B 17/0408 |
| 2018/0346829 | A1* | 12/2018 | Sun ..................... C10G 31/08 |

FOREIGN PATENT DOCUMENTS

| | | |
|---|---|---|
| GB | 520327 | 4/1940 |
| GB | 785765 A | 11/1957 |
| GB | 871207 | 6/1961 |
| KR | 20140056502 A | 5/2014 |
| RU | 2662154 C1 | 7/2018 |

OTHER PUBLICATIONS

* cited by examiner

ENHANCED HYDROPROCESSING PROCESS WITH AMMONIA AND CARBON DIOXIDE RECOVERY

TECHNICAL FIELD

The system and methods described relate to ammonia and carbon dioxide recovery. More specifically, provided are systems and methods for an integrated hydrocarbon process with ammonia and carbon dioxide recovery.

BACKGROUND OF THE ART

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In industrialized nations such as the United States, Japan and the countries of the European Union, refineries have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold after 2009 to contain less than 10 ppmw of sulfur. Other countries are following in the footsteps of the United States and the European Union and are moving forward with regulations that will require refineries to produce transportation fuels with ultra-low sulfur levels.

Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors due to the comparatively more severe operating conditions required (compared to original construction) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

To keep pace with recent trends toward production of ultra-low sulfur fuels, existing refiners may need to invest in additional processes, in many instances utilizing existing equipment, to ensure future specifications. Utilizing existing equipment and using additional processes can minimize additional capital investment.

SUMMARY

The system and methods described relate to ammonia and carbon dioxide recovery. More specifically, provided are systems and methods for an integrated hydrocarbon process with ammonia and carbon dioxide recovery.

In a first aspect, In a first aspect, a process for capturing carbon dioxide is provided. The process includes the steps of mixing a hydrogen stream and a feedstock stream to produce a mixed stream, where the feedstock stream includes hydrocarbons, where the hydrogen stream includes hydrogen, introducing the mixed stream to a hydroprocessing unit, the hydroprocessing unit configured to process the hydrocarbons to light products in a primary reactor, reacting the hydrocarbons and the hydrogen in the primary reactor of the hydroproces sing unit to produce a hydroprocessing product stream and a carbon dioxide stream, where the hydroprocessing product stream includes light products, where the carbon dioxide stream includes carbon dioxide, where the hydroprocessing unit is further configured to produce ammonium bisulfide, introducing a water stream to the hydroprocessing unit, where the water stream includes water, collecting the ammonium bisulfide in the water to produce a sour water, introducing the sour water to a waste water unit, processing the sour water in the waste water unit to produce an ammonia stream, a hydrogen sulfide stream, and a stripped water stream, where the ammonia stream includes ammonia, introducing the ammonia stream to a carbon dioxide recovery system, introducing the carbon dioxide stream to the carbon dioxide recovery system, and separating carbon dioxide from the carbon dioxide stream using the ammonia in the ammonia stream to produce a carbon dioxide product.

In certain aspects, the process further includes the steps of introducing a hydrocarbon feedstock and an oxygen-containing stream to a hydrogen production unit, where the hydrocarbon feedstock includes hydrocarbons with a carbon number of less than 5, where the hydrogen production unit is configured to process hydrocarbons with a carbon number of less than 5, and processing the hydrocarbons with a carbon number of less than 5 in the hydrogen production unit to produce the hydrogen stream and a byproduct stream, where the byproduct stream includes carbon dioxide. In certain aspects, the process further includes the steps of mixing the byproduct stream and the carbon dioxide stream to produce a combined stream, and introducing the combined stream to the carbon dioxide recovery system. In certain aspects, the feedstock stream is selected from the group consisting of a whole crude oil, a naphtha stream, a distillate stream, a vacuum gas oil stream, a vacuum residue stream, an intermediate refinery stream, and combinations of the same. In certain aspects, the hydroprocessing unit is selected from the group consisting of a hydrotreating unit, a hydrocracking unit, a residue hydrocracking unit, and combinations of the same. In certain aspects, the hydrocarbon feedstock includes natural gas. In certain aspects, the carbon dioxide product is operable for use in enhanced oil recovery operations.

In a second aspect, a process for producing a vehicle fuel is provided. The process includes the steps of mixing a hydrogen stream and a feedstock stream to produce a mixed stream, where the feedstock stream includes hydrocarbons, where the hydrogen stream includes hydrogen, introducing the mixed stream to a hydroprocessing unit, the hydroprocessing unit configured to process the hydrocarbons to light products in a primary reactor, reacting the hydrocarbons and the hydrogen in the primary reactor of the hydroproces sing unit to produce a hydroprocessing product stream and a carbon dioxide stream, where the hydroprocessing product stream includes light products, where the carbon dioxide stream includes carbon dioxide, where the hydroprocessing unit is further configured to produce ammonium bisulfide, introducing a water stream to the hydroprocessing unit, where the water stream includes water, collecting the ammonium bisulfide in the water to produce a sour water, introducing the sour water to a waste water unit, and processing the sour water in the waste water unit to produce an ammonia stream, a hydrogen sulfide stream, and a stripped water stream, where the ammonia stream includes ammonia, where the ammonia stream is operable to be used as the vehicle fuel.

In a third aspect, a system for capturing carbon dioxide is provided. The system includes a mixer configured to mix a hydrogen stream and a feedstock stream to produce a mixed stream, where the feedstock stream includes hydrocarbons, where the hydrogen stream includes hydrogen, a hydroprocessing unit fluidly connected to the mixer, the hydroprocessing unit configured to process the hydrocarbons to light products in a primary reactor of the hydroprocessing unit to produce a hydroprocessing product stream and a carbon dioxide stream, where the hydroprocessing product stream includes light products, where the carbon dioxide stream includes carbon dioxide, where the hydroprocessing unit is further configured to produce ammonium bisulfide, and a waste water unit fluidly connected to the hydroproces sing unit, the waste water unit configured to process a sour water stream produced by the hydroprocessing product stream to produce an ammonia stream, a hydrogen sulfide stream, and a stripped water stream, where the ammonia stream includes ammonia.

In certain aspects, the system further includes a hydrogen production unit configured to process a hydrocarbon feedstock and an oxygen-containing stream to produce the hydrogen stream and a byproduct stream, where the byproduct stream includes carbon dioxide. In certain aspects, the system further includes a carbon dioxide recovery system fluidly connected to the waste water unit, the carbon dioxide recovery system configured to separate carbon dioxide to produce a carbon dioxide product.

BRIEF DESCRIPTION OF THE DRAWINGS

These and other features, aspects, and advantages of the present embodiments will become better understood with regard to the following descriptions, claims, and accompanying drawings. It is to be noted, however, that the drawings illustrate only several embodiments of and are therefore not to be considered limiting of the scope as it can admit to other equally effective embodiments.

DETAILED DESCRIPTION

Figure 1:
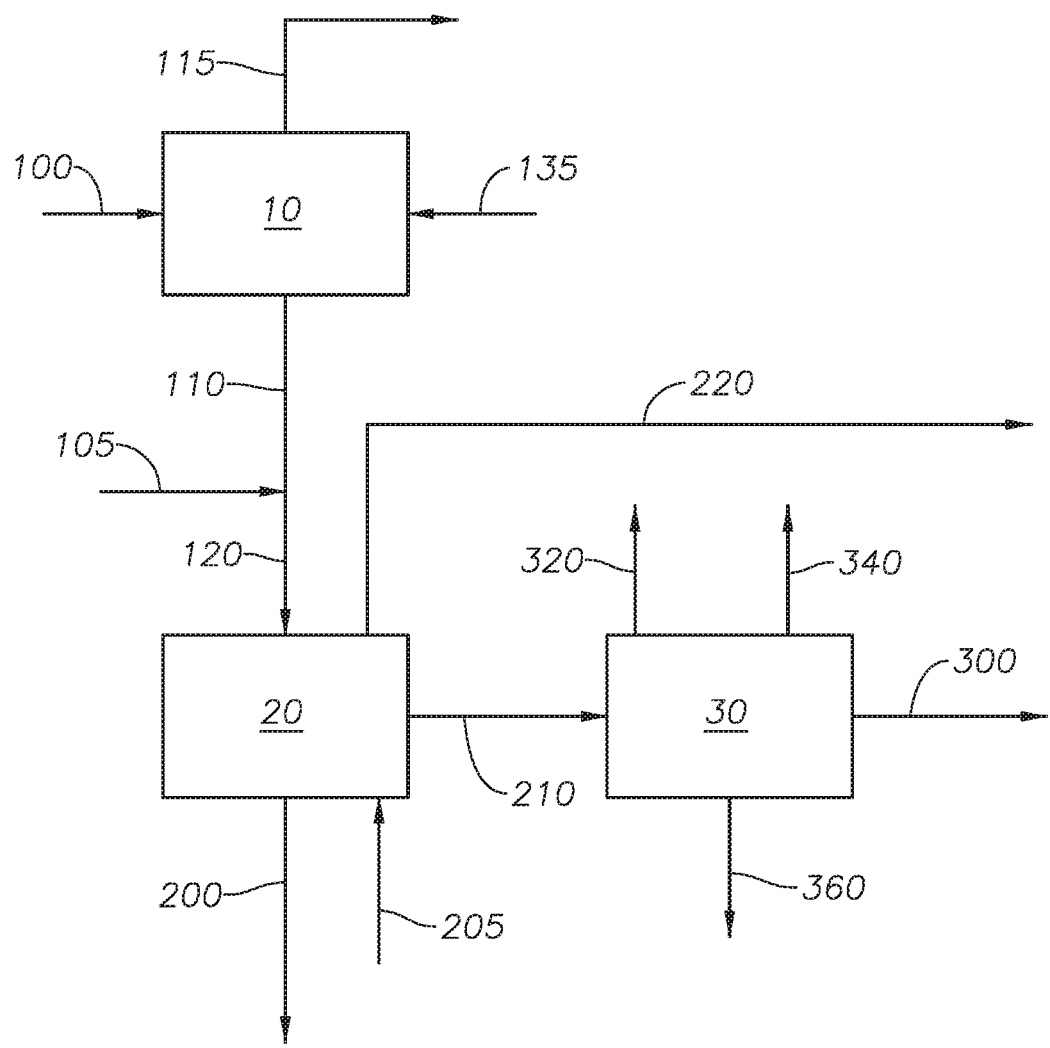
FIG. 1 is a process flow diagram of an embodiment of the system and method.

While several embodiments will be described, it is understood that one of ordinary skill in the relevant art will appreciate that many examples, variations and alterations to the apparatus and methods described herein are within the scope and spirit of the embodiments. Accordingly, the exemplary embodiments described herein are set forth without any loss of generality, and without imposing limitations, on the claimed embodiments.

The embodiments described here are directed to integrated processes and systems to produce carbon dioxide using ammonia absorption with ammonia produced in a hydroprocessing unit. Advantageously, the present integrated process can be retrofitted to existing hydroprocessing units. Advantageously, the integrated processes can reduce the amount of carbon dioxide released to atmosphere from the hydroprocessing unit, thus minimizing carbon emissions. Advantageously, the integrated processes and systems can reduce or eliminate the carbon dioxide released to the atmosphere. Advantageously, the integrated processes and systems described provide capture of carbon dioxide produced across multiple units beyond the limits of the hydroproces sing unit.

As used here, "carbon number" refers to the number of carbons in a hydrocarbon. For example, methane has a carbon number of 1 and propane has a carbon number of 3.

As used here, "hydrocracking unit" refers to a process unit designed to facilitate reactions that can crack or split the molecules of the feed into lighter molecules by increasing the hydrogen to carbon ratio and by removing heteroatoms, such as sulfur, nitrogen, and metals compounds. Hydrocracking units operate in the presence of a catalyst and in the presence of hydrogen. Hydrocracking units can produce naphtha range hydrocarbons, jet fuel or kerosene range hydrocarbons, and diesel range hydrocarbons, along with the unconverted hydrocarbons. The jet fuel or kerosene range hydrocarbons and diesel range hydrocarbons can have sulfur levels below the regulatory requirements.

As used here, "hydrotreating unit" refers to a process unit designed to facilitate reactions that can remove unwanted impurities such as sulfur, nitrogen from a crude oil fraction with hydrogen in the presence of a catalyst. Hydrotreating units can also remove oxygen. Hydrotreating units can operate at a hydrogen partial pressure in the range of between 10 bars and 200 bars and a temperature range between 280° C. and 450° C. The conditions selected for a hydrotreating unit depend on the feedstock being processed.

As used throughout, "naphtha stream" or "naphtha fraction" refers to a hydrocarbon fraction having compounds with boiling points between 26° C. and 180° C.

As used throughout, "distillate stream" or "distillate fraction" refers to a hydrocarbon fraction having compounds with boiling points between 180° C. and 370° C.

As used throughout, "vacuum gas oil" or "vacuum gas oil fraction" refers to a hydrocarbon fraction having compounds with boiling points between 370° C. and 565° C.

As used throughout, "vacuum residue" or "vacuum residue fraction" refers to a hydrocarbon fraction having compounds with boiling points greater than 565° C.

Referring to FIG. 1, an enhanced hydroprocessing process is described. Hydrocarbon feedstock 100 and oxygen-containing stream 135 can be introduced to hydrogen production unit 10. Hydrocarbon feedstock 100 can be any gas stream containing hydrocarbons with a carbon number of less than 5. Examples of hydrocarbon feedstock 100 include natural gas streams, streams containing hydrocarbons with a carbon number of less than 5. Natural gas streams can contain methane, ethane, propane, butanes, and amounts of hydrocarbons with a carbon number 5 or greater. The amount of hydrocarbons with a carbon number 5 or greater can be less than 1 weight percent (1 wt %), alternately less than 5 wt %, alternately less than 10 wt %, and alternately less than 15 wt %. Oxygen-containing stream 135 can contain oxygen. Oxygen-containing stream 135 can be air, oxygen, and combinations of the same.

Hydrogen production unit 10 can be any type of unit capable of producing hydrogen from a hydrocarbon stream. Hydrogen production units can include a steam methane reformer, a gasification reformer, and a dry reforming. In at least one embodiment, hydrogen production unit 10 can include a combustion chamber. Hydrogen production unit 10 can process hydrocarbon feedstock 100 to produce hydrogen stream 110 and byproduct stream 115. In at least one embodiment, the hydrocarbons can be combusted in the presence of oxygen to produce hydrogen and carbon dioxide. Hydrogen stream 110 can include hydrogen gas, methane, ethane, propane, butane, hexane, carbon monoxide, carbon dioxide, and combinations of the same. In at least one embodiment hydrogen stream 110 can include hydrogen gas, carbon monoxide, carbon dioxide, and combinations of the same. In at least one embodiment, hydrogen stream 110 can include hydrogen gas. In at least one embodiment, hydrogen stream 110 can include hydrogen gas, methane, ethane, propane, butane, hexane, and combinations of the same. Byproduct stream 115 can include carbon dioxide, carbon monoxide, and combinations of the same. In at least one embodiment, hydrogen stream 110 can include carbon dioxide.

Hydrogen stream 110 can be mixed with feedstock stream 105 to produce mixed feed 120. Feedstock stream 105 can be from any source that produces a hydrocarbon stream with hydrocarbons. Feedstock stream 105 can be a whole crude oil, a naphtha stream, a distillate stream, a vacuum gas oil stream, a vacuum residue stream, an intermediate refinery stream, and combinations of the same. The hydrocarbons in feedstock stream 105 can include naphtha fractions, kerosene fractions, diesel fractions, vacuum gas oil fractions, vacuum residue fractions, and combinations of the same. In at least one embodiment, feedstock stream 105 can include sulfur compounds and nitrogen compounds in addition to hydrocarbons.

Hydrogen stream 110 and feedstock stream 105 can be mixed in any type of mixing device capable of mixing a hydrocarbon stream and a gas stream to produce mixed stream 120. The ratio of the flow rate of feedstock stream 105 to hydrogen stream 110 is in the range between 50 standard liter per liter (SLt/Lt) and 2500 SLt/Lt. The ratio of the flow rate of feedstock stream 105 to hydrogen stream 110 depends on the source and type of feedstock being processed. The units of hydroprocessing unit 20 can include distributors to mix the hydrogen gas into the liquid fluids. The pressure of mixed stream 120 can be in the range between 10 bars and 200 bars.

Mixed stream 120 can be introduced to hydroprocessing unit 20. Hydroprocessing unit 20 can be any type of unit capable of processing hydrocarbons in the presence of hydrogen to produce converted hydrocarbons and then treating the converted hydrocarbons to produce hydroprocessing product stream 200. Processing in hydroprocessing unit 20 includes reacting the hydrocarbons in desulfurization reactions, denitrogenation reactions, conversion reactions, and combinations of the same. Hydroprocessing unit 20 can include a hydrotreating unit, a hydrocracking unit, a residue hydrocracking unit, and combinations of the same. Examples of hydrotreating units include diesel hydrotreating units. Examples of hydrocracking units include distillate hydrocracking units, mild hydrocracking units, and hydrocracking units. The operating conditions in the units of hydroprocessing unit 20 can include pressure in the range between 10 bars and 200 bars, temperature in the range between 280° C. and 450° C., and a liquid hourly space velocity (LHSV) of between 10 per hour ($h^{-1}$) and 0.1 $h^{-1}$. Hydroprocessing unit 20 can include one or more types of catalyst. Hydroprocessing unit 20 can include a primary reaction vessel, furnaces, heat exchangers, valves, separators, instrumentation and combinations of the same. In at least one embodiment, converted hydrocarbons can be separated and collected in hydroprocessing product stream 200, such that hydroprocessing product stream 200 contains converted hydrocarbons. The converted hydrocarbons can include light products. The light products can include a naphtha fraction, a distillate fraction, and combinations of the same. Advantageously, light products produced in hydroprocessing unit 20 can have greater economic value than the hydrocarbons in feedstock stream 105. Hydroprocessing product stream 200 can be used as fuels and alternately as a feedstock for petrochemical processing units. Carbon dioxide stream 220 can be generated in the furnaces of hydroprocessing unit 20. Carbon dioxide stream 220 can contain carbon dioxide, gas contaminants, and combinations of the same. The gas contaminants can include oxygen, nitrogen, nitrogen oxides, sulfur oxides, and combinations of the same. Hydrogen sulfide can be produced in hydroprocessing unit 20 as a result of desulfurization reactions of sulfur containing compounds in feedstock stream 105. Ammonia can be produced in hydroprocessing unit 20 as a result of removing nitrogen compounds present in feedstock stream 105. The amount of hydrogen sulfide produced in hydroprocessing unit 20 can be greater than the amount of ammonia due to the greater amount of sulfur containing compounds relative to nitrogen compounds. In at least one embodiment, carbon dioxide can be produced in a furnace of hydroproces sing unit 20 and can be collected in carbon dioxide stream 220.

Water stream 205 can be introduced to hydroproces sing unit 20 to separate ammonium bisulfide from the converted hydrocarbons to produce sour water stream 210. Ammonium bisulfide can be formed by a reaction between ammonia and hydrogen sulfide in hydroprocessing unit 20 due to changes in the thermodynamic conditions. Ammonium bisulfide is a solid and water stream 205 can prevent ammonium bisulfide deposition in the units of hydroprocessing unit 20. In at least one embodiment, an extraction unit can be used to separate the ammonium bisulfide from the converted hydrocarbons and into the water stream to produce a sour water. Sour water stream 210 can be introduced to waste water unit 30.

Figure 2:
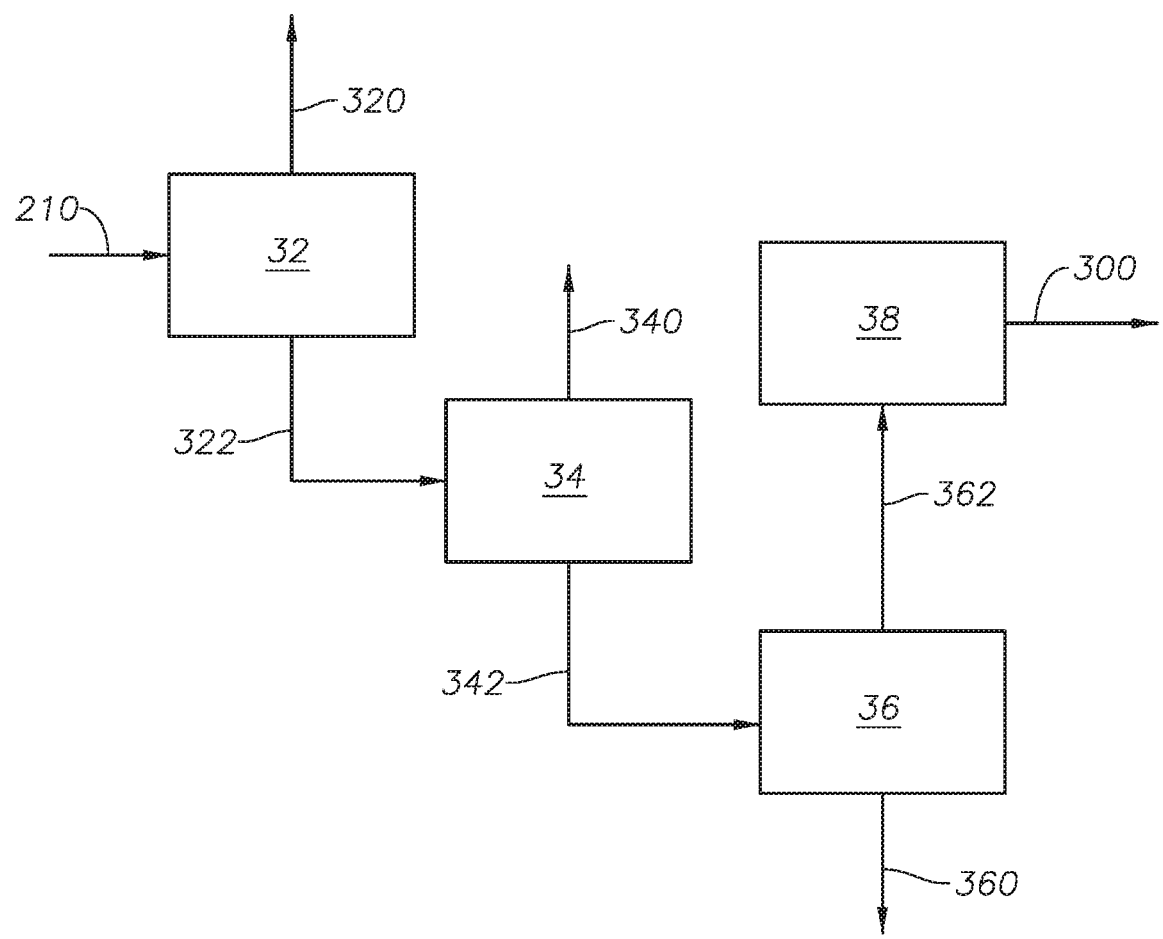
FIG. 2 is a process flow diagram of an embodiment of the system and method.

Waste water unit 30 can be any type of processing unit capable of purifying a water stream by removing contaminants. Waste water unit 30 can separate the ammonium bisulfide from sour water stream 210 and then convert the ammonium bisulfide to produce ammonia stream 300, light gases 320, hydrogen sulfide stream 340, and stripped water 360. Hydrogen sulfide stream 340 can contain hydrogen sulfide gas. Stripped water 360 can contain water. An embodiment of waste water unit 30 is described with reference to FIG. 2.

Sour water stream 210 can be introduced to degassing unit 32. Degassing unit 32 can be any type of unit capable of removing light gases from sour water stream 210. Light gases can include hydrogen, methane, ethane, and combinations of the same. Releases of acid gases can be minimized in degassing unit 32. Degassing unit 32 can include a storage tank to control flow throughout waste water unit 30 and to remove entrained oil and solids. Sour water stream 210 is processed in degassing unit 32 to produce light gases 320 and degassed water 322. Degassed water 322 can be introduced to gas stripping unit 34.

Gas stripping unit 34 can be any unit capable of removing ammonium bisulfide from a liquid stream. In gas stripping unit 34 the temperature of degassed water 322 can be increased which results in dissociation of the ammonium bisulfide to produce ammonia gas and hydrogen sulfide. Gas stripping unit 34 can include an acid gas stripper that uses a heated reboiler feed to strip hydrogen sulfide in hydrogen sulfide stream 340. Hydrogen sulfide stream 340 can contain hydrogen sulfide, carbon dioxide, ammonia, hydrocarbons, and combinations of the same. Hydrogen sulfide stream 340 can contain less than 1 wt % ammonia. Hydrogen sulfide stream 340 can contain less than 0.1 wt % hydrocarbons. Hydrogen sulfide stream 340 can be introduced to a sulfur recovery unit. The liquids in gas stripping unit 34 can exit as bottoms stream 342. Bottoms stream 342 can contain water, ammonia, hydrogen sulfide, and combinations of the same.

Bottoms stream 342 can be introduced to ammonia stripper 36. Ammonia stripper 36 can be any type of reflux unit that is capable of removing gases from a water stream. Ammonia stripper 36 can remove gases in the water stream to produce gas stream 362 and stripped water 360. Stripped water 360 can contain water and contaminants. Stripped water 360 can contain water, ammonia, hydrogen sulfide, and combinations of the same. Stripped water 360 can contain less than 50 parts-per-million by weight (ppmw) ammonia. Stripped water 360 can contain less than 10 ppmw hydrogen sulfide. Stripped water 360 can be recycled to other parts of the process, can be further treated, can be stored or can be disposed. Gas stream 362 can contain ammonia, hydrogen sulfide, and combinations of the same. Gas stream 362 can be introduced to ammonia purification unit 38.

Ammonia purification unit 38 can be any type of unit capable of separating ammonia vapor from gas stream 362. Ammonia purification unit 38 can include scrubbers, heat exchangers, separators, and other units. Ammonia purification unit 38 can produce ammonia stream 300.

Ammonia stream 300 can contain ammonia. Ammonia stream 300 can be further processed, can be stored, can be used in an alternate part of the process, can be used as an intermediate for another process, or can be destroyed.

In at least one embodiment, ammonia stream 300 can be used as a vehicle fuel. In at least one embodiment, ammonia stream 300 can be a hydrogen carrier used as fuel in a hydrogen vehicle.

Figure 3:
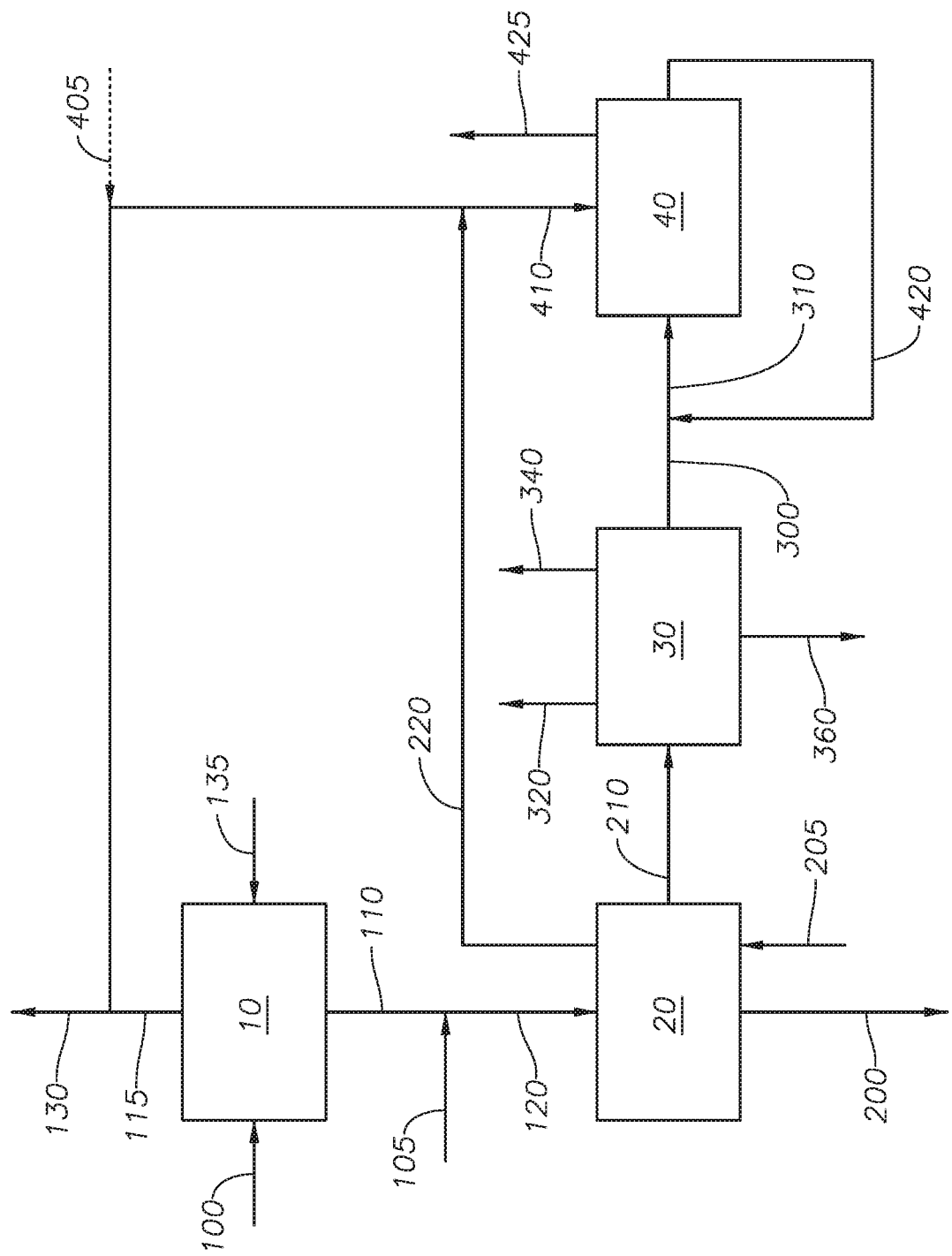
FIG. 3 is a process flow diagram of an embodiment of the system and method.

Referring to FIG. 3 with reference to FIG. 1, an alternate embodiment is provided. Ammonia stream 300 can be mixed with recycle ammonia 420 to produce mixed ammonia stream 310. Mixed ammonia stream 310 can be introduced to carbon dioxide recovery system 40.

A slip stream of carbon dioxide can be separated from byproduct stream 115 as slip stream 130. Slip stream 130 can be released to atmosphere, can be destroyed, or can be stored. The remaining carbon dioxide from byproduct stream 115 can be mixed with carbon dioxide stream 220 to produce combined stream 410. In at least one embodiment, added carbon dioxide stream 405 can be mixed with combined stream 410 to provide additional carbon dioxide. Combined stream 410 can contain carbon dioxide. Combined stream 410 can be introduced to carbon dioxide recovery system 40.

Carbon dioxide recovery system 40 can be any type of unit that can be used to separate carbon dioxide from other compounds using ammonia. An example of carbon dioxide recovery system 40 is an ammonia gas scrubbing unit. Carbon dioxide recovery system 40 can include absorbers, where ammonia can be used to absorb carbon dioxide from combined stream 410. Ammonia in mixed ammonia stream 310 can be used to purify the carbon dioxide. Any impurities can be sent to a flare or other incinerator unit. The purified carbon dioxide can exit carbon dioxide recovery system 40 as carbon dioxide product 425. Carbon dioxide product 425 can contain carbon dioxide, gas contaminants, and combinations of the same. The gas contaminants can include oxygen, nitrogen, nitrogen oxides, sulfur oxides, and combinations of the same. The gas contaminants can be less than 1000 ppmw, alternately less than 500 ppmw, and alternately less than 250 ppmw. Carbon dioxide product 425 can be stored underground, can be used in enhanced oil recovery, can be used as feed for processing hydrocarbons, and combinations of the same. The ammonia can be regenerated in carbon dioxide recovery system 40 and can be recycled as recycle ammonia 420.

EXAMPLE

Example 1 is a simulated example comparing a case without carbon dioxide capture (case 1) and a case using carbon dioxide capture (case 2). In both cases a diesel hydrotreating unit was simulated as hydroprocessing unit 20. The capacity of the furnace in diesel hydrotreating unit was simulated as 95,000 barrels per stream day (BPSD). Feedstock stream 105 contained 11,200 ppmw sulfur and 175 ppmw nitrogen. Temperature in hydroprocessing unit 20 was 371 degrees Celsius (deg C.) and pressure was 63 bar gauge (barg). Hydroprocessing product stream 200 contained 45 ppmw sulfur and 35 ppmw nitrogen. The results of the streams are shown in Table 1.

TABLE 1

| Product yields in streams | | |
|---|---|---|
|  | Case 1 (kg/h) | Case 2 (kg/h) |
| Stream 200 |  |  |
| Methane | 94 | 89 |
| Ethane | 94 | 94 |
| Propane | 141 | 141 |
| Butane | 141 | 141 |
| Hydrocarbons Middle Range[1] | 27,122 | 27,122 |
| High Boiling Hydrocarbons[2] | 490,537 | 490,537 |
| Stream 340 |  |  |
| Hydrogen Sulfide Stream 300 | 6,190 | 6,190 |
| Ammonia Stream 340 | 89 | 89 |
| Hydrogen Sulfide Stream 425 | 6,190 | 6,190 |
| Carbon Dioxide | 0 | 285,721[3] |

[1]Hydrocarbons Middle Range includes a range of hydrocarbons with a carbon number of 5 to hydrocarbons with a boiling point of 125° C.
[2]High Boiling Hydrocarbons includes hydrocarbons with a boiling point greater than 125° C.
[3]15 weight % of carbon dioxide was produced in hydrogen production unit 10 produced in hydroprocessing unit 20.

The results show that the integrated process and systems can capture a significant amount of carbon that would otherwise have been released to atmosphere.

Although the present embodiments have been described in detail, it should be understood that various changes, substitutions, and alterations can be made hereupon without departing from the principle and scope of the disclosure. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A process for capturing carbon dioxide, the process comprising the steps of:
   mixing a hydrogen stream and a feedstock stream to produce a mixed stream, wherein the feedstock stream comprises hydrocarbons, wherein the hydrogen stream comprises hydrogen;
   introducing the mixed stream to a hydroprocessing unit, the hydroprocessing unit configured to process the hydrocarbons to produce light products in a primary reactor, wherein the pressure of the mixed stream is between 10 bars and 200 bars;
   reacting the hydrocarbons and the hydrogen in the primary reactor of the hydroprocessing unit to produce a hydroprocessing product stream and a carbon dioxide stream, wherein the hydroprocessing product stream comprises light products, wherein the carbon dioxide stream comprises carbon dioxide and gas contaminants, wherein the hydroprocessing unit is further configured to produce ammonium bisulfide, wherein the gas contaminants are selected from the group consisting of oxygen, nitrogen, nitrogen oxides, sulfur oxides, and combinations of the same;
   introducing a water stream to the hydroprocessing unit, wherein the water stream comprises water;
   collecting the ammonium bisulfide produced in the hydroprocessing unit in the water of the water stream to produce a sour water;
   introducing the sour water to a waste water unit;
   processing the sour water in the waste water unit to produce an ammonia stream, a hydrogen sulfide stream, and a stripped water stream, wherein the ammonia stream comprises ammonia, wherein the waste water unit separates the ammonia bisulfide from sour water stream and then converts the ammonium bisulfide to ammonia;
   introducing the ammonia stream to a carbon dioxide recovery system;
   introducing the carbon dioxide stream to the carbon dioxide recovery system; and
   separating carbon dioxide from the carbon dioxide stream using the ammonia in the ammonia stream to produce a carbon dioxide product.

2. The process of claim 1, further comprising the steps of:
   introducing a hydrocarbon feedstock and an oxygen-containing stream to a hydrogen production unit, wherein the hydrocarbon feedstock comprises hydrocarbons with a carbon number of less than 5, wherein the hydrogen production unit is configured to convert hydrocarbons with a carbon number of less than 5; and
   processing the hydrocarbons with a carbon number of less than 5 in the hydrogen production unit to produce the hydrogen stream and a byproduct stream, wherein the byproduct stream comprises carbon dioxide.

3. The process of claim 2, further comprising the steps of:
   mixing the byproduct stream and the carbon dioxide stream to produce a combined stream; and
   introducing the combined stream to the carbon dioxide recovery system.

4. The process of claim 1, wherein the feedstock stream is selected from the group consisting of a whole crude oil, a naphtha stream, a distillate stream, a vacuum gas oil stream, a vacuum residue stream, an intermediate refinery stream, and combinations of the same.

5. The process of claim 1, wherein the hydroprocessing unit is selected from the group consisting of a hydrotreating unit, a hydrocracking unit, a residue hydrocracking unit, and combinations of the same.

6. The process of claim 2, wherein the hydrocarbon feedstock comprises natural gas.

7. The process of claim 1, wherein the carbon dioxide product is operable for use in enhanced oil recovery operations.

* * * * *